United States Patent
Kaikkonen et al.

(10) Patent No.: US 11,924,755 B2
(45) Date of Patent: Mar. 5, 2024

(54) FACILITATING DISCONTINUOUS RECEPTION FOR MUTLI-PANEL USER EQUIPMENT

(71) Applicant: NOKIA TECHNOLOGIES OY, Espoo (FI)

(72) Inventors: Jorma Johannes Kaikkonen, Oulu (FI); Timo C Koskela, Oulu (FI); Mihai Enescu, Espoo (FI); Sami-Jukka Hakola, Kempele (FI); Juha Pekka Karjalainen, Oulu (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 228 days.

(21) Appl. No.: 17/054,656

(22) PCT Filed: May 14, 2018

(86) PCT No.: PCT/EP2018/062367
§ 371 (c)(1),
(2) Date: Nov. 11, 2020

(87) PCT Pub. No.: WO2019/219162
PCT Pub. Date: Nov. 21, 2019

(65) Prior Publication Data
US 2021/0076324 A1   Mar. 11, 2021

(51) Int. Cl.
*H04W 52/02* (2009.01)
*H04B 7/06* (2006.01)
(Continued)

(52) U.S. Cl.
CPC ...... *H04W 52/0216* (2013.01); *H04B 7/0617* (2013.01); *H04B 7/0695* (2013.01);
(Continued)

(58) Field of Classification Search
CPC ................................................. H04W 52/0216
See application file for complete search history.

(56) References Cited

U.S. PATENT DOCUMENTS 7,340,254 B2 * 3/2008 Iacono ................ H04B 17/309
370/332
9,844,094 B2 * 12/2017 Lee ....................... H04W 76/28
(Continued)

FOREIGN PATENT DOCUMENTS

CN    102300294 A    12/2011
CN    104025469 A    9/2014
(Continued)

OTHER PUBLICATIONS

First Examination Report dated Dec. 27, 2021 corresponding to Indian Patent Application No. 202047052931.
(Continued)

*Primary Examiner* — Guang W Li
(74) *Attorney, Agent, or Firm* — SQUIRE PATTON BOGGS (US) LLP

(57) ABSTRACT

Method, apparatus, and computer program product for a user equipment in a wireless communications system to receive configuration information that has one or more TCI-states. With this configuration information, the user equipment can then determine inactivity on TCI-states. Based on that determination, the user equipment enables either a discontinuous monitoring or a cessation of monitoring on those TCI-states. Each TCI-state corresponds to a radio beam and also corresponds to an antenna panel. By reducing such monitoring, the use equipment can deactivate antenna panels corresponding to the TCI-states. The determination can be done through the use of a timer with various time thresholds based on the TCI-state. The activity being transmitted on those beam can be scheduling received by the user equipment from a network element such as a base station. The
(Continued)

TCI-states can also be grouped and the functionality of the invention dealt with on a group basis.

8 Claims, 8 Drawing Sheets

(51) Int. Cl.
*H04W 24/08* (2009.01)
*H04W 72/53* (2023.01)
*H04W 76/28* (2018.01)

(52) U.S. Cl.
CPC ....... *H04W 24/08* (2013.01); *H04W 52/0274* (2013.01); *H04W 72/53* (2023.01); *H04W 76/28* (2018.02)

(56) References Cited

U.S. PATENT DOCUMENTS

| | | | | |
|---|---|---|---|---|
| 11,516,882 | B2* | 11/2022 | Sun | H04L 5/0053 |
| 2005/0176385 | A1* | 8/2005 | Stern-Berkowitz | H04W 36/18 455/73 |
| 2013/0172002 | A1* | 7/2013 | Yu | H04L 1/0668 455/452.1 |
| 2015/0208462 | A1* | 7/2015 | Lee | H04W 52/0209 370/311 |
| 2015/0223085 | A1* | 8/2015 | Siomina | H04W 52/0229 370/252 |
| 2018/0146430 | A1* | 5/2018 | Yadav | H04W 52/0241 |
| 2019/0319833 | A1* | 10/2019 | Nagaraja | H04L 5/001 |
| 2020/0120584 | A1* | 4/2020 | Yi | H04W 74/0866 |
| 2020/0169995 | A1* | 5/2020 | Nam | H04W 72/21 |
| 2020/0389847 | A1* | 12/2020 | Deng | H04W 52/0219 |
| 2021/0076324 | A1* | 3/2021 | Kaikkonen | H04W 76/28 |
| 2021/0298108 | A1* | 9/2021 | Wu | H04W 72/23 |
| 2022/0124853 | A1* | 4/2022 | Virtej | H04W 76/15 |
| 2022/0140884 | A1* | 5/2022 | Shi | H04W 76/18 370/329 |
| 2022/0279554 | A1* | 9/2022 | Li | H04L 5/0091 |

FOREIGN PATENT DOCUMENTS

| | | | | |
|---|---|---|---|---|
| CN | 104782218 A | | 7/2015 | |
| KR | 20140042338 A | | 4/2014 | |
| WO | 2017028883 A1 | | 2/2007 | |
| WO | WO 2015/106543 A1 | | 7/2015 | |
| WO | WO-2015106543 A1 | * | 7/2015 | ............ H04W 24/02 |
| WO | 2017162293 A1 | | 9/2017 | |

OTHER PUBLICATIONS

Nokia et al., "Remaining details on QCL," R1-1718769, 3GPP TSG RAN WG1 Meeting #90bis, Prague, Czech Republic, Oct. 9, 2017.
International Search Report and Written Opinion dated Dec. 19, 2018 corresponding to International Patent Application No. PCT/EP2018/062367.
Communication pursuant to Article 94(3) EPC dated Sep. 3, 2021 corresponding to European Patent Application No. 18725456.0.
First Office Action issued in corresponding Chinese Patent Application No. 201880095028.4 dated Dec. 15, 2023, with concise English language summary thereof.
R2-1806985, "3GPP TS 38.331 Baseline CR for the UE capabilities", 2018.

* cited by examiner

| TCI INDEX | SOURCE RS SET | SOURCE RS INDEX | QCL TYPE |
|---|---|---|---|
| 0 | RS SET #A | SS/PBCH BLOCK #n (OF SET #A) | A+D |
| 1 | RS SET #B | TRS #b (OF SET #B) | A |
|   |   | CSI-RS #c (OF SET #B) | D |
| ... | ... | ... | ... |
| M−1 | RS SET #E | CSI-RS #b (OF THE SET #E) | A+D |

FIG.1

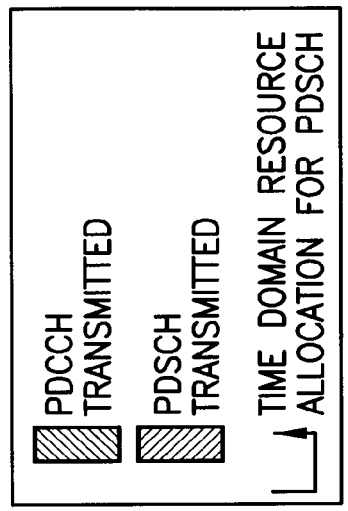
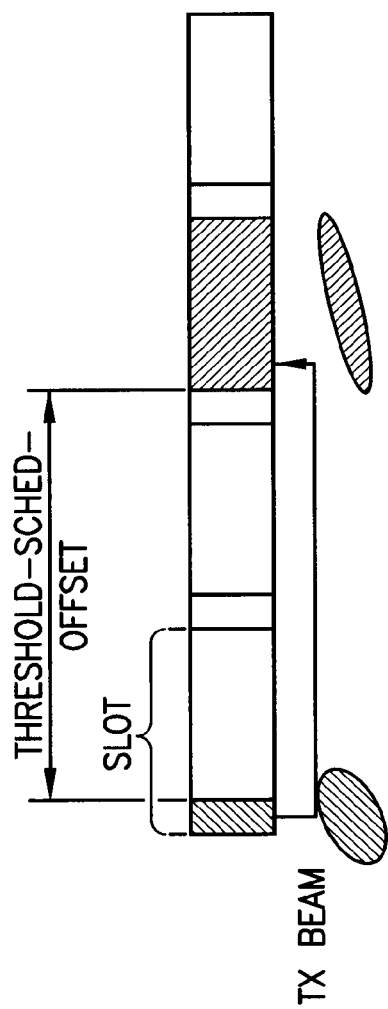
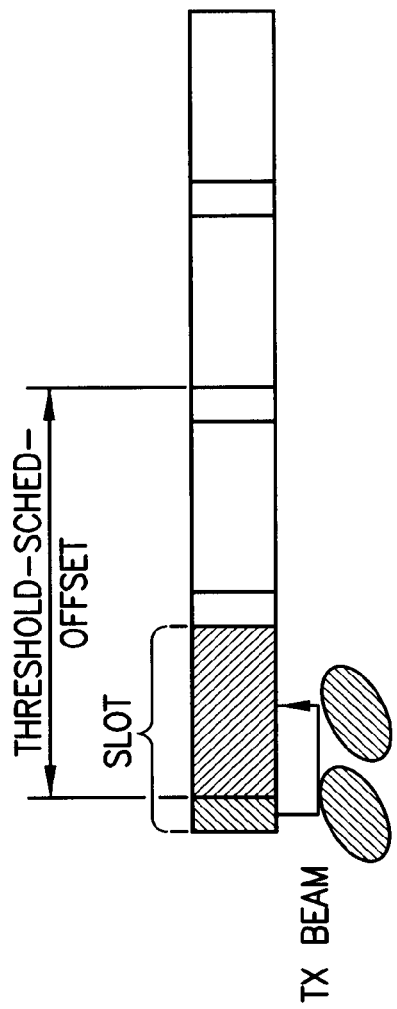

FACILITATING DISCONTINUOUS RECEPTION FOR MUTLI-PANEL USER EQUIPMENT

TECHNICAL FIELD

This invention relates generally to 3GPP New Radio (NR) physical layer design and, in particular, new mechanisms for energy saving for UEs with different beamforming capabilities.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

At higher carrier frequencies, for instance at above 6 GHz, UEs are generally expected to have multiple transmit and receive antenna panels and to operate using more narrow RF beams than omni pattern for both the reception and transmission. As an example, a UE may be equipped with four cross-polarized antenna panels. While the UE may be equipped with four TXRUs but for power saving purpose it would be preferable to switch off panels that are not needed e.g. for data transmission and/or reception. Changing a TX or RX beam "within a panel" can be performed typically within some tens to hundred nanoseconds but switching beam between panels, i.e. changing operating panel, may require even some milliseconds in case the panel is in 'power save mode'—currently in RAN4 understanding is that up to 2 ms delay may be assumed for the UE being able to operate on the newly active antenna panel.

A common Quasi-CoLocation (QCL) and Transmit Configuration Indication (TCI) framework is used for defining "transmit beam" for different downlink physical signals and channels like for periodic, semi-persistent and aperiodic CSI-RS (Channel State Information-Reference Signals), and PDCCH (Physical Downlink Control Channel) and PDSCH (Physical Downlink Shared Channel). For that, the UE is configured with a TCI table in which each row/state is associated with one or two RSs that act as a source RS(s) in terms of different QCL parameters (delay spread, average delay, Doppler spread, Doppler shift, spatial RX) for the certain downlink signal. When UE is configured with Spatial RX QCL parameters for the certain source RS, the UE can assume that the same UE RX beam can be used when receiving the scheduled physical signal or physical channel as was used for receiving the source RS.

In following, overview of the PDCCH beam indication is provided. The UE can be configured up to 3 CORESETs and together 10 search space sets within a configured bandwidth part (BWP). CORESET defines physical time and frequency resources on which PDCCH targeted for the UE may be transmitted. Search space set defines PDCCH monitoring related time domain parameters such as monitoring periodicity: In other words, search space parameters provide a UE with information when trying to detect PDCCH from a certain CORESET—i.e. a time domain filter or pattern.

A QCL framework is used for defining a "transmit beam" for different downlink physical signals and channels such as those for periodic, semi-persistent, and aperiodic CSI-RS, PDCCH, and PDSCH. As such, a UE is configured with a TCI table in which each row/state is associated with one or two reference signals (RSs) that act as a source RS(s) in terms of different QCL parameters (e.g., delay spread, average delay, Doppler spread, Doppler shift, spatial RX) for the certain downlink signal. When a spatial RX QCL parameter is to be configured for the certain source RS, the UE can assume the same RX beam (or RX spatial filter) can be applied when receiving a target physical signal or physical channel as was used for receiving the source RS. Source RS may be e.g. SS/PBCH Block (Synchronization signal/Physical Broadcast Channel, also referred as SSB), CSI-RS, TRS (tracking reference signal), DMRS (demodulation reference signal) or the like. SS/PBCH block consists of PSS, SSS (Primary, Secondary SS) and symbols carrying PBCH, including PBCH DMRS and has total length of 4 symbols. Invention is not limited to the potential alternative transmission methods of SS/PBCH block in time or frequency domain (in other words, for instance, instead of sending 4 symbols, if the SS block components may be transmitted in frequency domain, for example, using only one symbol, that would satisfy this aspect).

For determining the transmit beam for the PDCCH, it has previously been agreed that each CORESET may be associated to one or multiple of the above mentioned TCI rows (or TCI states). In cases where the CORESET is associated with more than one TCI states, a MAC level indication is used as activation signaling to control which one of the multiple TCI states the UE shall apply as active at a certain time for a given CORESET.

Search space set related parameters associated to the CORESET define time domain monitoring pattern. From this time domain pattern the UE knows when to monitor a certain CORESET and from associated active TCI state of the CORESET, the UE knows which RX beam settings to use to receive the CORESET.

FIG. 1 provides an exemplary TCI table configured for the UE, where the different QCL types provides different information: QCL type A means Doppler spread, Doppler shift, delay spread, average delay and QCL type D means spatial RX. Thus, when TCI index 0 determines source RS(s) for a certain physical signal or channel, the UE can determine that it can set its RX beam as it was set when receiving the SS/PBCH block #n. Correspondingly, when TCI index 1 determines source RS(s) for a certain physical signal or channel, the UE can determine that it can set its RX beam as it was set when receiving the CSI-RS # (of RS set #B).

FIG. 2 illustrates the case that UE has been configured two CORESETs with one or multiple TCI state associations. For the CORESET #0, MAC-CE signaling is used to activate one of the configured TCI states at a time—i.e. either TCI state 0, 1 or 5.

FIG. 3 shows three implementation options are available for PDSCH beam indication. PDSCH beam indication method is controlled by a higher layer parameter TCI-PresentInDCI and the offset between the reception of the DCI (Downlink Control Information) and the corresponding PDSCH. TCI-PresentInDCI is configured per CORESET In FIG. 3A, if TCI-PresentInDCI is set as 'Disabled' for the CORESET scheduling the PDSCH or the PDSCH is scheduled by a DCI format 1_0, then TX beam for PDSCH is the same as for the PDCCH. FIG. 3A shows the default mode.

In FIG. 3B, if the TCI-PresentInDCI is set as 'Enabled' and time offset between the reception of the DL DCI and the corresponding PDSCH is equal to or greater than a threshold Threshold-Sched-Offset, then TX beam for PDSCH is indicated by TCI index in DCI. (Threshold can be e.g. 1 or 2 slots). Dynamic mode is shown which would allow different TX beam (more narrow, different TRP, etc.) for PDSCH.

In FIG. 3C, if the TCI-PresentinDCI is set as 'Enabled'/'Disabled' and time offset between the reception of the DCI and the corresponding PDSCH is less than a threshold Threshold-Sched-Offset, then TX beam for PDSCH corresponds to PDCCH TX beam of the lowest CORESET-ID in the latest slot in which one or more CORESETs are configured for the UE. Fallback mode is shown with one CORESET and in a case where PDSCH follows PDCCH equals to Default mode.

Controlling parameter Threshold-Sched-Offset is not yet defined but likely it will be one or two slots assuming 120 kHz SCS. That means that threshold for dynamic beam indication for PDSCH is around 125-250 µs, such that when PDSCH is scheduled after one or two slots later than PDCCH the PDSCH can be transmitted with different transmit beam than the PDCCH.

The current limitation of state of the art in 3GPP RAN-79 meeting, a new study item proposal related to different UE power saving and wake-up mechanisms was proposed, namely, RP-180229, Study on UE power saving and wakeup mechanisms in NR, CATT, CMCC, VIVO, CATRI, Qualcomm, Mediatek. The study item proposal addressed the need for developing new UE power/energy saving mechanisms in general but especially for higher carrier frequencies above 6 GHz. Particularly, new mechanisms are needed that enable efficiently to combine beam management and power saving.

Given the beam based access framework provided above there are no functionalities to support UE power saving in controlled manner when UE is operating using multiple TX and RX panels. Furthermore, according to aforementioned RAN-79 discussions, it is very likely that the support for beam management based power saving mechanisms will be discussed and potentially specified under Rel-16 NR.

Furthermore, the following can be considered as a current state of the art in the area of network controlled discontinuous reception. In LTE and NR Connected mode Discontinuous Reception (DRX) was determined to allow UE to monitor PDCCH in a discontinuous manner according to the rules and parameters defined e.g. in 36.321 Section 5.7. When UE is not required to monitor PDCCH, it may turn off its receiver hardware and reduce the receiver power consumption. Most relevant of the parameters given, for example, in 36.321 (sec. 5.7) are the following:

drx-InactivityTimer, which determines how soon after ceasing of DL and/or UL activity UE may start to apply the discontinuous PDCCH monitoring. Once the drx-InactivityTimer has expired UE is required to monitor the PDCCH only during onDurationTimer once every DRX cycle. Two different DRX cycles can be configured; shortDRX-Cycle (optional) and longDRX-Cycle;

The PDCCH discontinuous monitoring pattern according to shortDRX-Cycle is applied first (if configured) and followed by longDRX-Cycle;

onDurationTimer determines the minimum active time UE needs to monitor the PDCCH (unless not required by other rules) every DRX cycle; and When there is no shortDRX-Cycle defined or the drxShortCycleTimer (determining how soon after applying short DRX cycle UE may start to use long DRX) has expired UE may start to monitor PDCCH in a discontinuous manner according to longDRX-Cycle.

Moreover, if UE is indicated by the PDCCH a new transmission (either in DL or in UL), UE needs to re-start the drx-InactivityTimer.

The current invention moves beyond the current techniques and/or materials.

Abbreviations that may be found in the specification and/or the drawing figures are either defined in the text or defined below in the following list of abbreviations:

2G Second Generation
3G Third Generation
3GPP Third Generation Partnership Project
5G Fifth Generation
5G-NB Fifth Generation Node B
BFR Beam Failure Recovery
BFRQ Beam Failure Recovery Request
BLER Block Error Ratio
BS Base Station
BSI Beam State Information
BRI Beam Refinement Information
BRS Beam Reference Signal
BRRS Beam Refinement Reference Signal
CCE Control Channel Element
CORESET Control Resource Set
C-RNTI Cell Radio Network Temporary Identifier
DL Downlink
DMRS Demodulation Reference Signal
DRX Discontinuous Reception
DTX Discontinuous Transmission
eNB or eNodeB Evolved Node B (LTE base station)
gNB NR/5G Node B
NB NodeB, base station
MAC-CE Medium Access Control-Control Element
NR New Radio
PDCCH Physical Downlink Control Channel
PUCCH Physical Uplink Control Channel
PUSCH Physical Uplink Shared Channel
QCL Quasi Co-location
RA Random Access
ReTx Retransmission or retransmitting
RRH Remote radio head
RS Reference Signal
RSRP Reference Signal Received Power
RSRQ Reference Signal Received Quality
Rx, RX Reception or receiving
SINR Signal to Interference and Noise Ratio
SR Scheduling Request
TCI Transmission Configuration Indication
TS Technical Specification or Technical Standard
Tx, TX Transmission or transmitting
TXRU Transceiver Unit
UE User Equipment or mobile station
UL Uplink

BRIEF SUMMARY

This section is intended to include examples and is not intended to be limiting. The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

An example of an embodiment of the current invention is a method that comprises receiving, by a user equipment in a wireless communications system, configuration information comprising one or more transmission configuration indication states; determining, based on said configuration information, inactivity on the one or more transmission configuration indication states; and enabling, based on the determining, discontinuously monitoring or ceasing monitoring of the one or more transmission configuration indication states.

An example of another embodiment of the current invention is an apparatus that comprises at least one processor and at least one memory including computer program code, where the at least one memory and the computer code are configured, with the at least one processor, to cause the apparatus to at least perform the following: receiving, in a wireless communications system, configuration information comprising one or more transmission configuration indication states; determining, based on said configuration information, inactivity on the one or more transmission configuration indication states; and enabling, based on the determining, discontinuously monitoring or ceasing monitoring of the one or more transmission configuration indication states.

An example of another embodiment of the current invention is an apparatus that comprises means for receiving, in a wireless communications system, configuration information comprising one or more transmission configuration indication states; means for determining, based on said configuration information, inactivity on the one or more transmission configuration indication states; and means for enabling, based on the determining, discontinuously monitoring or ceasing monitoring of the one or more transmission configuration indication states.

An example of another embodiment of the current invention is a computer program product embodied on a non-transitory computer-readable medium in which a computer program is stored that, when being executed by a computer, is configured to provide instructions to control or carry out: receiving, by a user equipment in a wireless communications system, configuration information comprising one or more transmission configuration indication states; determining, by the user equipment, based on said configuration information, inactivity on the one or more transmission configuration indication states; and enabling, by the user equipment, based on the determining, discontinuously monitoring or ceasing monitoring of the one or more transmission configuration indication states.

BRIEF DESCRIPTION OF THE DRAWINGS

In the attached Drawing Figures:

FIG. 1 is TCI table configured for the UE;

DETAILED DESCRIPTION OF THE DRAWINGS

Figure 2:
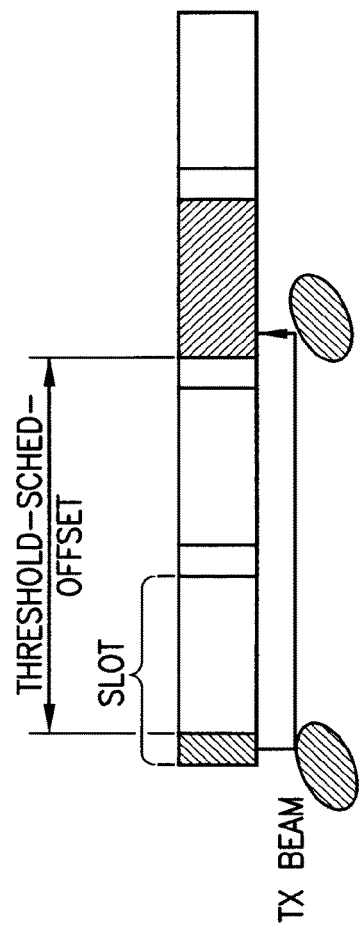
FIG. 2 is a schematic of a UE configured with two CORESETs with one or multiple TCI state associations.
Figure 3A:
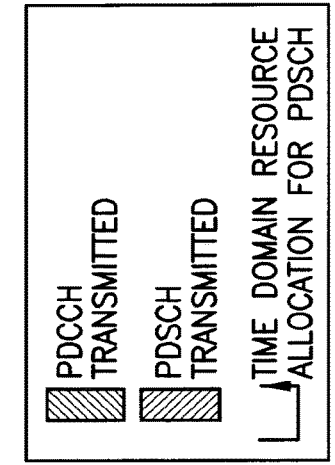
FIG. 3 presents three implementation options available for PDSCH beam indication and includes FIG. 3A showing the default mode, FIG. 3B showing the dynamic mode, and FIG. C showing the fallback mode.

The current Application discloses mechanisms for energy saving for UEs with different kind of beamforming capabilities.

Please note that examples and embodiments discussed herein are not intended to be limiting. Moreover, the word "exemplary" as used herein means "serving as an example, instance, or illustration." Thus, any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

For UEs that support multiple RX/TX panels, which will be baseline for UEs operating in FR2, it is important to ensure and allow UE power savings when possible. For LTE Rel-8 connected mode DRX was developed to enable UE power savings when a UE was not actively scheduled. At that time, a basic UE implementation assumption was, as it is now for FR1, that the UE would be using omnidirectional antennas.

For FR2, a baseline assumption is multi antenna/panel UEs, such that the UE will have more than one panel but will, in general, only actively use one at a time. For power saving reasons, it would be beneficial to enable the UE to operate using only a subset of the TXRUs and panels—only those which are needed for communicating with the network and allow efficient power savings by enabling the UE to turn off panels which are not expected to be used actively.

At the time of the invention, a UE could be configured with a TCI table for beam management. Additionally, the UE would be configured with a number of CSI-RS (or SSBs) for beam management measurements. The UE measures the configured RS and reports (L1-RSRP) the results to the gNB, which then might use the reported results to change the operating beam, which is done by changing the TCI Index (i.e. indicating to the UE which source reference symbols should be used for DL reception). Whether a TCI index change leads to panel change on the UE side is not known to the gNB but left for UE implementation.

That the gNB does not have visibility to a panel change on UE side means that a constant worst case delay has been introduced for each beam change to enable UE power savings. However, such delay is not optimal and introduced an unwanted and often unnecessary latency delay in the beam management procedure and actual beam switch, which in the end may have negative impact on beam management.

What is needed is a way to enable UE power savings while ensuring low latency beam management such that any necessary delays due to power savings are allowed when needed, while, in other cases, both the UE and the network can benefit from low latency beam management.

Herein, we describe enabling UE power savings by introducing discontinuous reception rules for multi-panel devices. As discussed above, for a UE in FR2 it is assumed that it will need to support beam forming. Additionally, it is assumed that a UE will have more than one antenna panel (i.e. omnidirectional reception is assumed baseline as in FR1).

A principle of the invention is based on a UE being able to scheduled using different TCI indexes. A given TCI may lead to a UE using a specific panel for reception. A UE scheduled using a given TCI, using a given panel, may apply power saving to that antenna panel depending on the time since the TCI was last used for scheduling, such that if the UE was receiving using a given panel, then the UE is allowed to switch off the panel (power saving) if the time since last reception using the given panel exceeds a certain time threshold.

The UE may be provided with information, for instance a configuration, enabling the power saving opportunities for one or more TCI state/set of the configured TCI states. The UE can then determine, based on the configuration and active TCI state, which TX/RX panels it is allowed to deactivate/turn off, for instance, for power saving purposes.

Power savings could be achieved for example by at least two ways. A first way would be based on the current DRX cycle (i.e. after expiry of InactivityTimer/drxShortCycleTimer) that corresponds to a configured TCI-state or set of TCI-states. Another way would be that the UE can assume that network does not schedule that UE or schedules that UE only on beams corresponding to specific set of TCI-states which can enable power saving accordingly.

In a manifestation of the current invention, information is conveyed to a UE by use of TCI configurations (corresponding possibly to different UE RX and/or TX panels) giving different DRX inactivity timers from monitoring perspective. In this manifestation, the UE could be provided priority order of TCI-states that are disabled upon expiry of inactivity timer. And, as activity (scheduling) is not expected on those states, the UE can deactivate panels corresponding to the deactivated TCI-states. Specifically, activity determination would be based on joint activity determination (i.e. joint inactivity timers) and based on different time thresholds, such that the UE could assume that certain TCI-states are not used (scheduled to) or can be used in lower periodicity. Alternatively, each TCI-state/group could be given a state/group specific inactivity timer based on which the corresponding beams/TCI-states could be disabled or monitored at reduced rate.

In one implementation option when different TCI states have been disabled or monitored with reduced rate and UE decodes its C-RNTI on at least one of the configured CORESETs with configured or implicit TCI state, the UE reactivates all the panels, all panels corresponding to configured TCI-states and states such that the UE monitors these with normal rate/periodicity. Alternatively, only the TCI state that used to schedule UE is activated and the monitoring is continued with normal periodicity. For example, if the UE decodes its C-RNTI on a channel corresponding at least one of the TCI states, it reactivates the one or more panels for a (configurable) minimum time period.

In one expression, when entering either short or long DRX, the UE may use the SS block source RS as a TCI state if the active TCI-state refers to CSI-RS. In particular, if a UE is configured with full set of TCI states for PDCCH monitoring on duration and with a subset of TCI-states for short and long DRX, then it determines per active TCI-state whether the reference signal is SSB or CSI-RS; if the RS is CSI-RS UE assumes the SS block source RS to be the TCI state when in DRX (short/long).

The present invention also involves activity determination for inactivity timer handling.

Activity Determination for Inactivity Timer Handling

In one manifestation of the invention, evaluation of activity on the given TCI-state or group of TCI-states could be based on use of TCI (belonging to the group) for scheduling (as UE may be scheduled with different PDCCH and PDSCH beams). Here, the activity of TCI-state is based on indication on DCI, such that scheduling PDSCH is to a particular TCI-state. In addition, TCI-groups could be provided priorities such that if lower priority TCI-group is active, then the inactivity timer of higher priority group does not expire. In other words, activity determination for lower priority TCI-group C is based solely on scheduling activity on TCIs belonging to TCI-group C, but for higher priority TCI-group B the activity is determined based on TCIs belonging to TCI-group C and B, while for highest priority (e.g. fallback) TCI-group A scheduling PDSCH to any TCI-state would prevent expiry of the inactivity timer.

In another manifestation of the invention, grouping of TCI-states could be done so that they correspond to a given CORESET (e.g. dedicated CORESETs #1 and #2 assuming CORESET #0 is configured with SS/PBCH blocks only as source RSs or source RS is determined implicitly by UE representing a default CORESET using a default transmit beam), and the activity is determined based on activity on a corresponding CORESET. For example, the Inactivity timer is reset every time PDCCH is detected on any search space corresponding to the CORESET. In a variant of this manifestation, the activity detection is based on only USS or/and certain PDCCH types (e.g. Type0-PDCCH) are excluded from the activity detection.

For instance, the UE may be configured with one or more PUCCH resources per PUCCH resource set, where each of the resources may be configured with information concerning one or more spatial relationships (of which one can be active at a time) where the relation information defines how the UE would determine the transmit beam for the resource (also a group of PUCCH resources corresponding to a PUCCH resource set may be configured with the same transmit beam). Each PUCCH resource or PUCCH resource set may be configured with an inactivity timer. If such timer is expired, then the UE could switch off a panel used for transmission of certain PUCCH resource or PUCCH resources of a certain PUCCH resource set and, correspondingly, the UE could apply a DTX pattern for the configured periodic and semi-persistent transmissions, like SRS, that are using the same transmit beam as configured for the PUCCH resource(s) in question. Moreover, a signaling indication could be provided by the gNB if UE needs to switch from a DTX pattern per PUCCH resource (or group of PUCCH resources) or if only a certain "default" PUCCH resource or PUCCH resource set needs to switch from a DTX pattern to "normal" operation. The signaling may be in DCI used to schedule UE data or, in general, be in a downlink signal which switches the UE from DRX/DTX to active mode. In a similar manner, different sets of PUCCH resources may be DTX'ed based on the UE DRX cycle (short, long), allowing a similar type of energy saving opportunities as for DRX.

Figure 4:
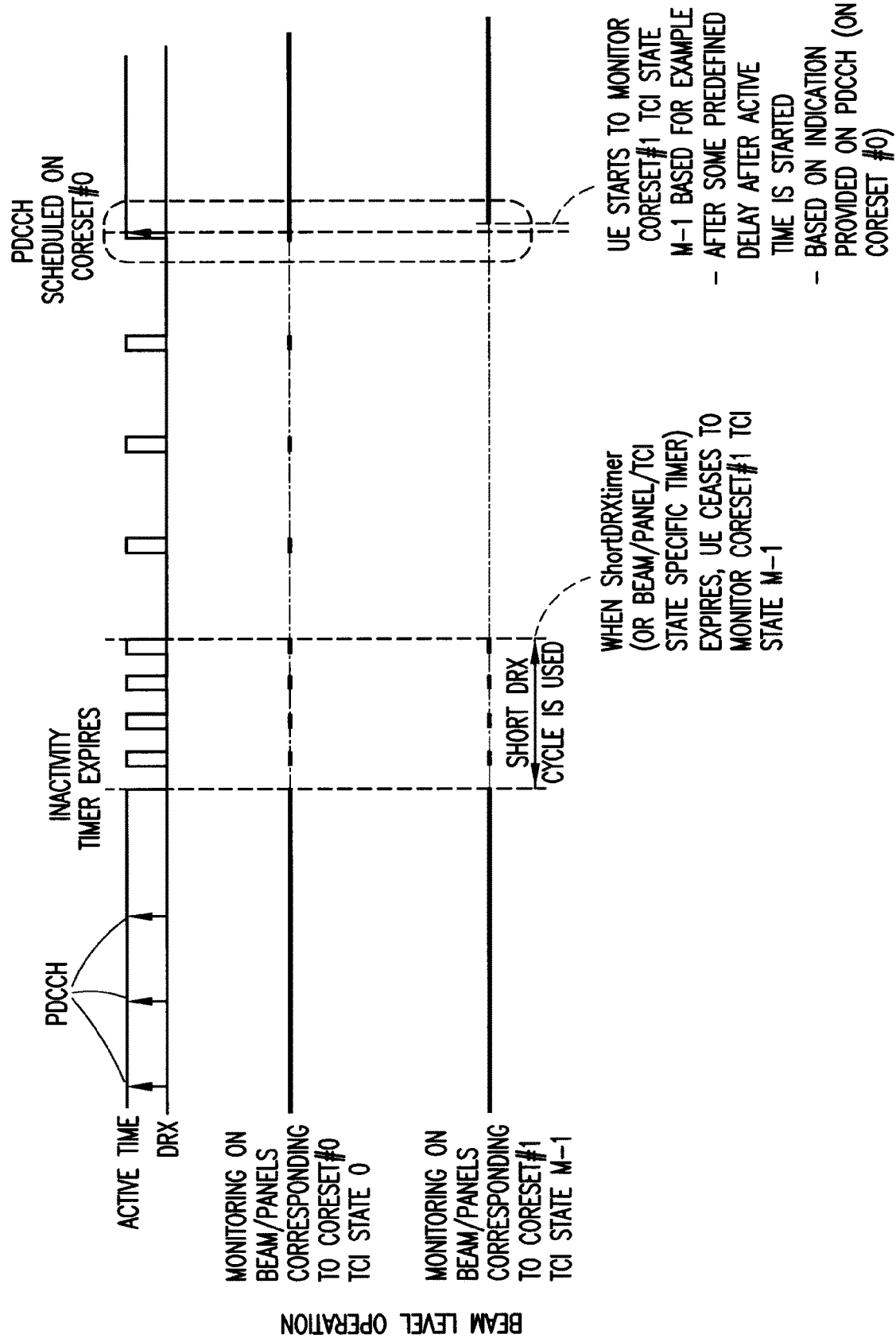
FIG. 4 is an illustration of beam/panel DRX operation.

In FIG. 4 illustrates one possible behavior based on various representations of the invention. In the behavior described in FIG. 4, a UE is configured by a primary beam(s) (or it could always correspond to a TCI state of CORESET #0) so that when UE falls to long DRX (from short DRX), then the UE will only continue monitoring the primary beam (corresponding to CORESET #0 in example) during the onDurations, enabling the UE to save power by disabling beam/panel hardware related to TCI state of CORESET #1. In alternative implementations, the monitoring of the beam corresponding to CORESET #1 could cease immediately after the inactive timer expires without applying a short DRX cycle or, alternatively, by applying a long DRX cycle based discontinuous reception after expiry of the short DRX timer.

In the behavior illustrated in the FIG. 4, once a UE is scheduled with PDCCH (in a beam corresponding to CORESET #0), then the UE will start an inactivity timer and start continuous PDCCH monitoring. The UE also resumes monitoring the beam corresponding to CORESET #1. Monitoring of the beam (i.e. TCI-state) corresponding to CORESET #1 could be triggered by the first PDCCH scheduling (to CORESET #0), an indication on the PDCCH (to enable further power saving by preventing the activation of hardware of second panel/beam) or expiry of some other timer such as related to minimum active time (e.g. to ensure that additional panels are not unnecessarily activated for short activity).

Figure 5:
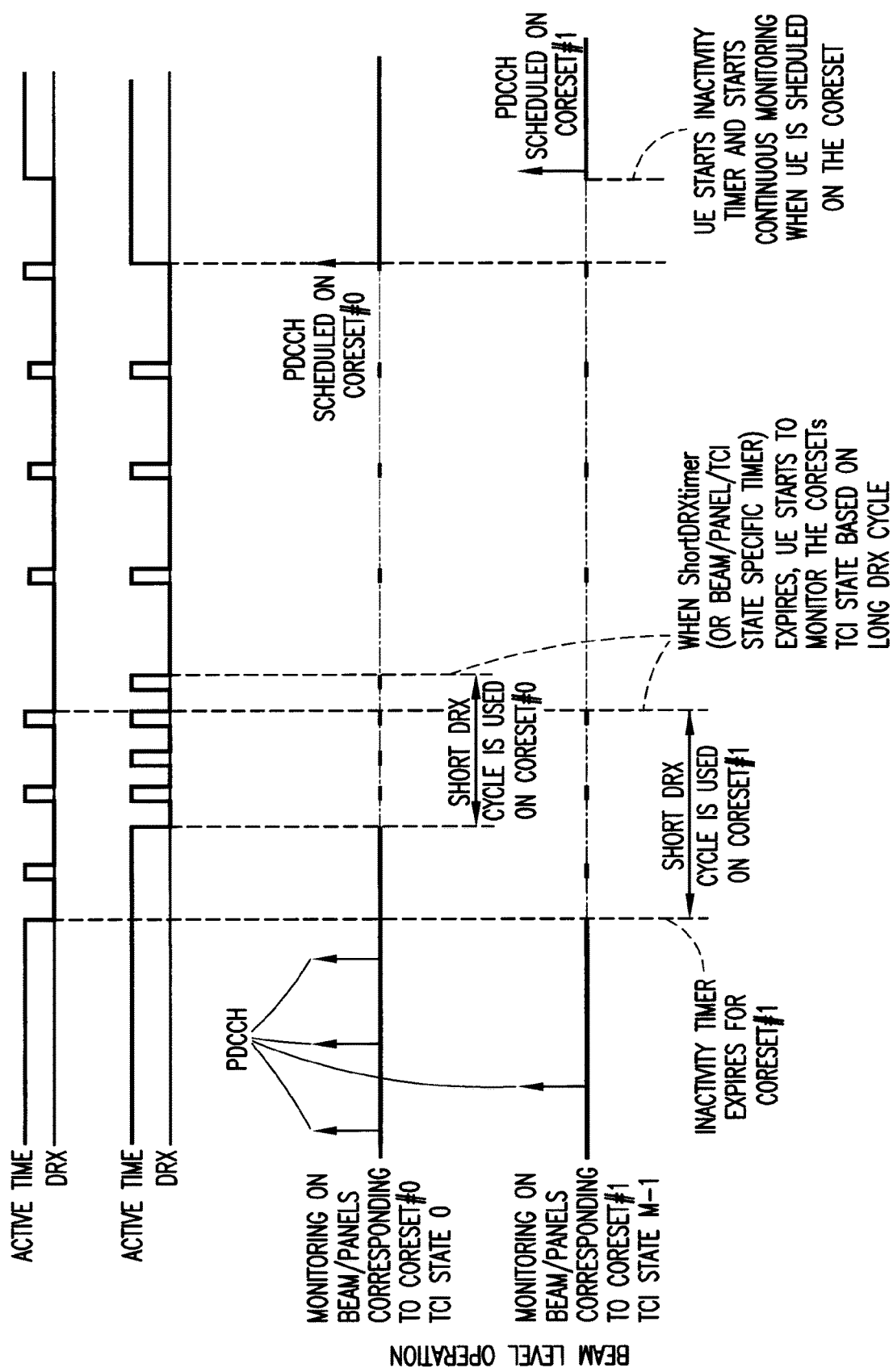
FIG. 5 is also an illustration of beam/panel DRX operation.

FIG. 5 illustrates another possible implementation, where the gNB configures DRX parameters or behavior separately for each TCI indexes corresponding to a configured CORESET. In this approach, each TCI-state group would have its individual DRX behavior.

Figure 6:
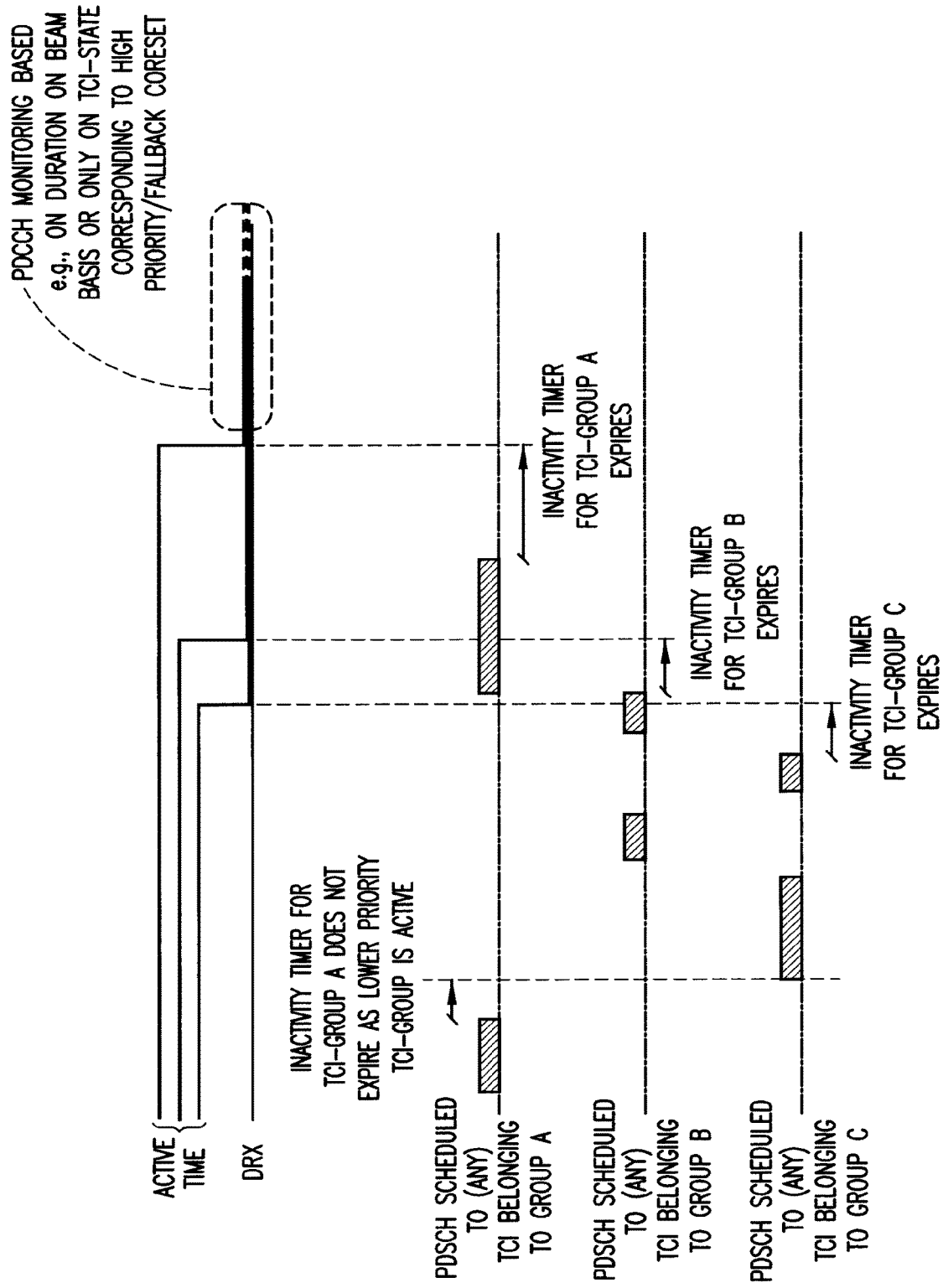
FIG. 6 is an illustration of beam/panel C-DRX operation based on prioritization and PDSCH scheduling activity.

FIG. 6 illustrates an example of behavior for the case when the discontinuous reception is determined per TCI-group and the activity is determined based on PDSCH activity on any TCI belonging to a group or set of groups. As shown in FIG. 6, the discontinuous reception can be started on low priority TCI-groups once, for instance, PDSCH scheduling triggered inactivity timer expires but for high(er) priority TCI-group(s) where the requirement for starting the discontinuous reception is that other TCI-group(s) of lower priority have already gone inactive.

In another alternative implementation, the network configures the DRX behavior or parametrization separately for each Source RS index—panel index pair that has been constructed. This could, for example, define certain RS (or TCI-state) with DRX configuration, where all other RS that use that RS (or TCI-state) as a QCL source, would follow same DRX configuration.

In further alternative implementation, the network could define masks that define a group of TCIs and provide a DRX configuration for each TCI mask.

Figure 7:
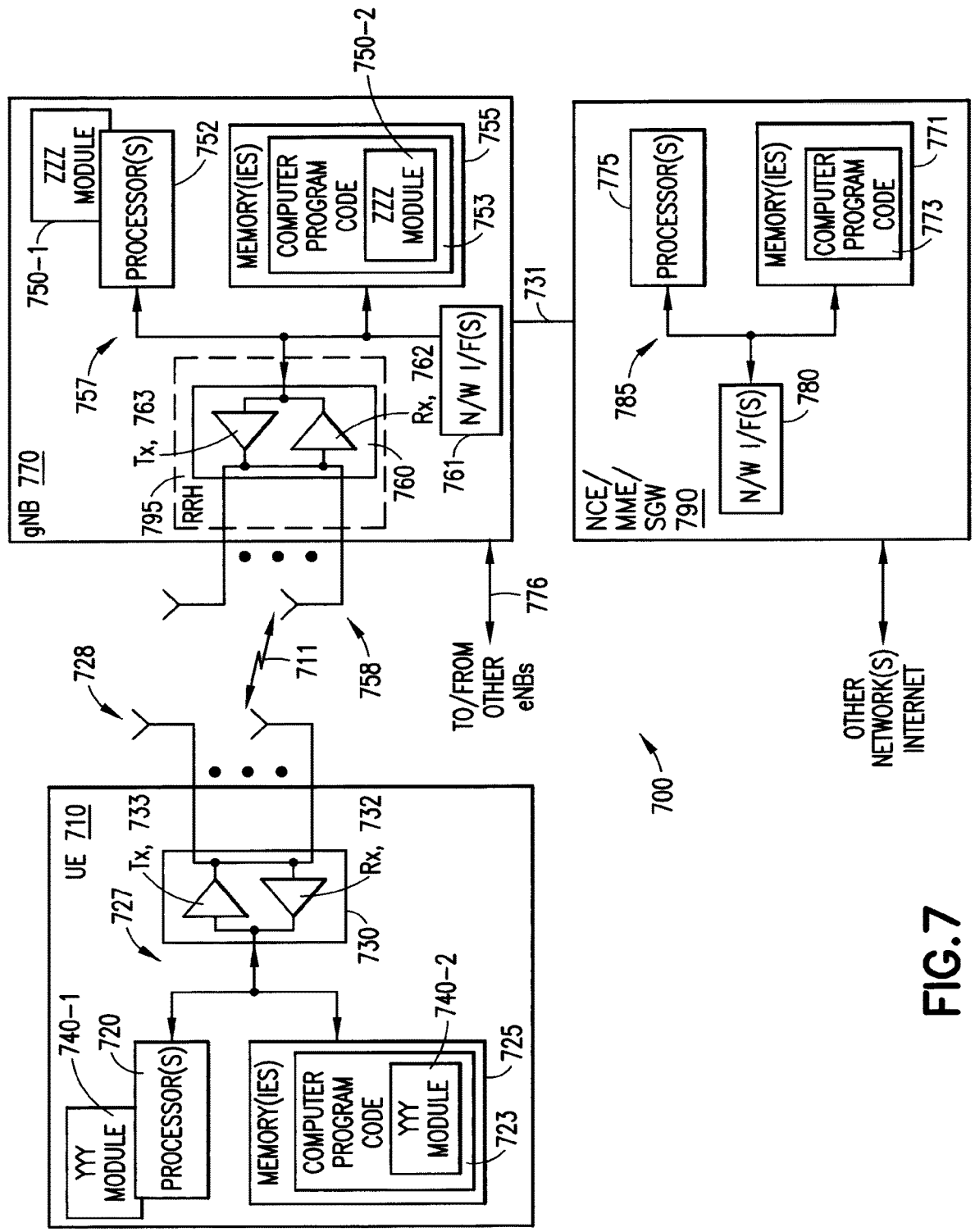
FIG. 7 is a block diagram of one possible and non-limiting exemplary system in which the exemplary embodiments may be practiced.

FIG. 7, which is a block diagram of one possible and non-limiting exemplary system in which the exemplary embodiments may be practiced. In FIG. 7, a user equipment (UE) 710 is in wireless communication with a wireless network 700. A UE is a wireless, typically mobile device that can access a wireless network. The UE 710 includes one or more processors 720, one or more memories 725, and one or more transceivers 730 interconnected through one or more buses 727. Each of the one or more transceivers 730 includes a receiver, Rx, 732 and a transmitter, Tx, 733. The one or more buses 727 may be address, data, or control buses, and may include any interconnection mechanism, such as a series of lines on a motherboard or integrated circuit, fiber optics or other optical communication equipment, and the like. The one or more transceivers 730 are connected to one or more antennas 728. The one or more memories 725 include computer program code 723. Note that the YYY module allows functionality for the usage of control resources for data transmission where any method or examples of such embodiments discussed herein can be practiced. The UE 710 includes a YYY module 740, comprising one of or both parts 740-1 and/or 740-2, which may be implemented in a number of ways. The YYY module 740 may be implemented in hardware as YYY module 740-1, such as being implemented as part of the one or more processors 720. The YYY module 740-1 may be implemented also as an integrated circuit or through other hardware such as a programmable gate array. In another example, the YYY module 740 may be implemented as YYY module 740-2, which is implemented as computer program code 723 and is executed by the one or more processors 720. For instance, the one or more memories 725 and the computer program code 723 may be configured to, with the one or more processors 720, cause the user equipment 710 to perform one or more of the operations as described herein. The UE 710 communicates with gNB 770 via a wireless link 711.

Base station (a New Radio 5G NodeB, which would be denoted as gNB, or perhaps an evolved NodeB, which would be denoted as an eNB) 770 provides access by wireless devices such as UE 710 to the wireless network 700. The gNB 770 includes one or more processors 752, one or more memories 755, one or more network interfaces (N/W I/F(s)) 761, and one or more transceivers 760 interconnected through one or more buses 757. Each of the one or more transceivers 760 includes a receiver, Rx, 762 and a transmitter, Tx, 763. The one or more transceivers 760 are connected to one or more antennas 758. The one or more memories 755 include computer program code 753. Note that the ZZZ module allows functionality for the usage of control resources for data transmission where any method or examples of such embodiments discussed herein can be practiced. The gNB 770 includes a ZZZ module 750, comprising one of or both parts 750-1 and/or 750-2, which may be implemented in a number of ways. The ZZZ module 750 may be implemented in hardware as ZZZ module 750-1, such as being implemented as part of the one or more processors 752. The ZZZ module 750-1 may be implemented also as an integrated circuit or through other hardware such as a programmable gate array. In another example, the ZZZ module 750 may be implemented as ZZZ module 750-2, which is implemented as computer program code 753 and is executed by the one or more processors 752. For instance, the one or more memories 755 and the computer program code 753 are configured to, with the one or more processors 752, cause the gNB 770 to perform one or more of the operations as described herein. The one or more network interfaces 761 communicate over a network such as via the links 776 and 731. Two or more gNBs 770 communicate using, e.g., link 776. The link 776 may be wired or wireless or both and may implement, e.g., an X2 interface.

The one or more buses 757 may be address, data, or control buses, and may include any interconnection mechanism, such as a series of lines on a motherboard or integrated circuit, fiber optics or other optical communication equipment, wireless channels, and the like. For example, the one or more transceivers 760 may be implemented as a remote radio head (RRH) 795, with the other elements of the gNB 770 being physically in a different location from the RRH, and the one or more buses 757 could be implemented in part as fiber optic cable to connect the other elements of the gNB 770 to the RRH 795.

It is noted that description herein indicates that "cells" perform functions, but it should be clear that the gNB that forms the cell would perform the functions. The cell makes up part of a gNB. That is, there can be multiple cells per gNB. For instance, there could be three cells for a single gNB carrier frequency and associated bandwidth, each cell covering one-third of a 360-degree area so that the single gNB's coverage area covers an approximate oval or circle. Furthermore, each cell can correspond to a single carrier and a gNB may use multiple carriers. So if there are three 120-degree cells per carrier and two carriers, then the gNB has a total of 6 cells.

The wireless network 700 may include a network control element (NCE) 790 that may include MME (Mobility Management Entity)/SGW (Serving Gateway) functionality, and which provides connectivity with a further network, such as a telephone network and/or a data communications network (e.g., the Internet). The gNB 770 is coupled via a link 731 to the NCE 790. The link 731 may be implemented as, e.g., an S1 interface. The NCE 790 includes one or more processors 775, one or more memories 771, and one or more network interfaces (N/W I/F(s)) 780, interconnected through one or more buses 785. The one or more memories 771 include computer program code 773. The one or more memories 771 and the computer program code 773 are configured to, with the one or more processors 775, cause the NCE 790 to perform one or more operations.

The wireless network 700 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors 752 or 775 and memories 755 and 771, and also such virtualized entities create technical effects.

The computer readable memories 725, 755, and 771 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 725, 755, and 771 may be means for performing storage functions. The processors 720, 752, and 775 may be of any type suitable to the local technical environment, and may include one or more of general purpose computers, special purpose computers, microprocessors, digital signal processors (DSPs) and processors based on a multi-core processor architecture, as non-limiting examples. The processors 720, 752, and 775 may be means for performing functions, such as controlling the UE 710, gNB 770, and other functions as described herein.

In general, the various embodiments of the user equipment 710 can include, but are not limited to, cellular phones such as smart devices, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless Internet access and browsing, tablets with wireless communication capabilities, as well as portable units or terminals that incorporate combinations of such functions. In addition, various embodiments of the user equipment include machines, communicators and categories of equipment, which are not primarily or not at all in use by human interaction.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Figure 8:
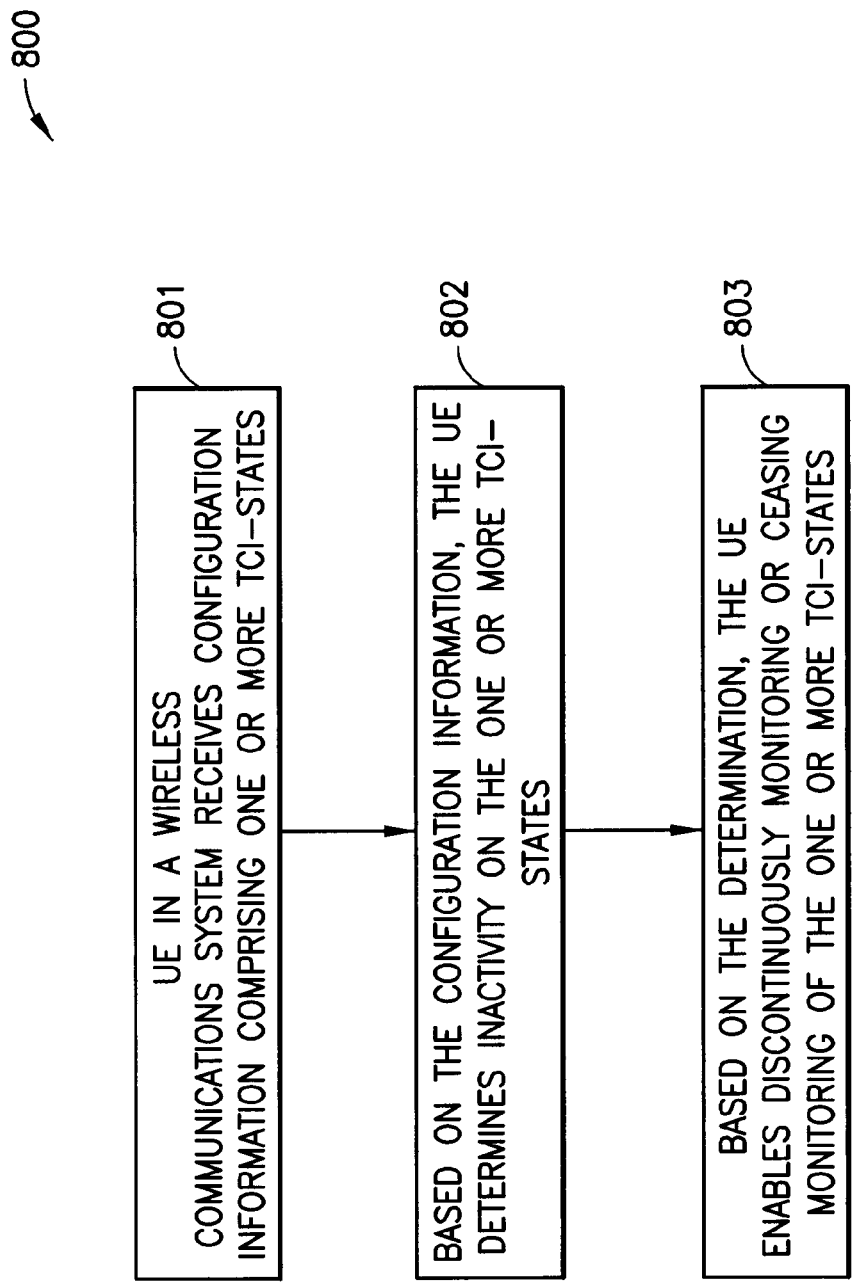
FIG. 8 is a logic flow diagram an exemplary method, a result of execution of computer program instructions embodied on a computer readable memory, functions performed by logic implemented in hardware, and/or interconnected means for performing functions in accordance with exemplary embodiments.

FIG. 8 is a logic flow diagram of an exemplary method of the current invention, a result of execution of computer program instructions embodied on a computer readable memory, functions performed by logic implemented in hardware, and/or interconnected means for performing functions in accordance with exemplary embodiments. Parts or all of method 800 could be performed in module YYY or module ZZZ as appropriate.

In step 801, a UE in a wireless communications system receives configuration information comprising one or more TCI-states. In step 802, the UE, based on the configuration information, determines inactivity on the one or more TCI-states. In step 803, the UE, based on the determination, enables discontinuously monitoring or ceasing monitoring of the one or more TCI-states.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is to enable UE power savings while ensuring low latency beam management such that any necessary delays due to power savings allowed when needed while in other cases both the UE and the network can benefit from low latency beam management.

An example of an embodiment of the current invention, which can be referred to as item 1, is a method that comprises receiving, by a user equipment in a wireless communications system, configuration information comprising one or more transmission configuration indication states; determining, based on said configuration information, inactivity on the one or more transmission configuration indication states; and enabling, based on the determining, discontinuously monitoring or ceasing monitoring of the one or more transmission configuration indication states.

An example of a further embodiment, which can be referred to as item 2, is the method of item 1, wherein each transmission configuration indication state of the one or more transmission configuration indication states corresponds to a beam.

An example of a further embodiment, which can be referred to as item 3, is the method of any preceding item, wherein the determining is based on one or more timers with one or more time thresholds for each transmission configuration indication state of the one or more transmission configuration indication states.

An example of a further embodiment, which can be referred to as item 4, is the method of item 3, wherein each time threshold of the one or more time thresholds is assigned based on ascertaining the ability of the beam to be monitored at a limen, wherein the limen is based on a periodicity reduced from continuous or from a pre-established norm, and wherein the limen is calculated or pre-determined.

An example of a further embodiment, which can be referred to as item 5, is the method of any preceding item, wherein a transmission configuration indication state of the one or more transmission configuration indication states corresponds to an antenna panel of one or more antenna panels of the user equipment.

An example of a further embodiment, which can be referred to as item 6, is the method of item 5, further comprising: upon expiry of a timer of the one or more timers associated with the transmission configuration indication state of the one or more transmission configuration indication states, disabling the antenna panel of one or more antenna panels corresponding to the transmission configuration indication state of the one or more transmission configuration indication states.

An example of a further embodiment, which can be referred to as item 7, is the method of item 6, wherein the disabled one or more antenna panels are deactivated or discontinuously activated.

An example of a further embodiment, which can be referred to as item 8, is the method of any item 7, wherein discontinuously activated comprises monitoring with a pre-determined periodicity.

An example of a further embodiment, which can be referred to as item 9, is the method of item 7, wherein activating of the panel corresponds to monitoring of the transmission configuration indication state.

An example of a further embodiment, which can be referred to as item 10, is the method of any preceding item, further comprising: in response to the enabling of the ceasing monitoring or the discontinuously monitoring of the one or more transmission configuration indication states, decoding cell radio network temporary identifier on at least one other of the one or more transmission configuration indication states, wherein the one other was not subject to the enabling.

An example of a further embodiment, which can be referred to as item 11, is the method of item 10, further comprising: monitoring the at least one other of the one or more transmission configuration indication states either continuously or with a periodicity greater than the discontinuous.

An example of a further embodiment, which can be referred to as item 12, is the method of item 10, wherein the at least one other of the one or more transmission configuration indication states is a lone transmission configuration indication state used to schedule the user equipment.

An example of a further embodiment, which can be referred to as item 13, is the method of items 10 through 12, further comprising: reactivating one or more additional antenna panels of the one or more antenna panels for the monitoring of the at least one other of the one or more transmission configuration indication states.

An example of a further embodiment, which can be referred to as item 14, is the method of item 10 through 13, further comprising: reactivating one or more additional antenna panels of the one or more antenna panels for a predetermined minimum time period, where the predetermined time period is configurable.

An example of a further embodiment, which can be referred to as item 15, is the method of any preceding item, wherein the user equipment has a plurality of antenna panels supporting beamforming and/or permitting the user equipment to have omnidirectional reception.

An example of a further embodiment, which can be referred to as item 16, is the method of any preceding item, wherein inactivity comprises no scheduling.

An example of a further embodiment, which can be referred to as item 17, is the method of item 16, wherein the user equipment may be scheduled using different and/or multiple transmission configuration indication states.

An example of a further embodiment, which can be referred to as item 18, is the method of any preceding item, wherein the user equipment is configured with a transmission configuration indication state that is active for a control resource set.

An example of a further embodiment, which can be referred to as item 19, is the method of any preceding item, wherein the one or more transmission configuration indication states are grouped into one or more transmission configuration indication groups.

An example of a further embodiment, which can be referred to as item 20, is the method of item 19, wherein each transmission configuration indication group is assigned a group specific timer based on the monitoring of the one or more transmission configuration indication states in each group.

An example of another embodiment of the current invention, which can be referred to as item 21, is an apparatus that comprises at least one processor and at least one memory including computer program code, where the at least one memory and the computer code are configured, with the at least one processor, to cause the apparatus to at least perform the following: receiving, in a wireless communications system, configuration information comprising one or more transmission configuration indication states; determining, based on said configuration information, inactivity on the one or more transmission configuration indication states; and enabling, based on the determining, discontinuously monitoring or ceasing monitoring of the one or more transmission configuration indication states.

An example of a further embodiment, which can be referred to as item 22, is the apparatus of item 21, wherein each transmission configuration indication state of the one or more transmission configuration indication states corresponds to a beam.

An example of a further embodiment, which can be referred to as item 23, is the apparatus of any of items 21 through 22, wherein the determining is based on one or more timers with one or more time thresholds for each transmission configuration indication state of the one or more transmission configuration indication states.

An example of a further embodiment, which can be referred to as item 24, is the apparatus of item 23, wherein each time threshold of the one or more time thresholds is assigned based on ascertaining the ability of the beam to be monitored at a limen, wherein the limen is based on a periodicity reduced from continuous or from a pre-established norm, and wherein the limen is calculated or predetermined.

An example of a further embodiment, which can be referred to as item 25, is the apparatus of any of items 21 through 24, wherein a transmission configuration indication state of the one or more transmission configuration indication states corresponds to an antenna panel of one or more antenna panels of the apparatus.

An example of a further embodiment, which can be referred to as item 26, is the apparatus of item 25, wherein the at least one memory and the computer code are further configured, with the at least one processor, to cause the apparatus to at least further perform the following: upon expiry of a timer of the one or more timers associated with the transmission configuration indication state of the one or more transmission configuration indication states, disabling the antenna panel of one or more antenna panels corresponding to the transmission configuration indication state of the one or more transmission configuration indication states.

An example of a further embodiment, which can be referred to as item 27, is the apparatus of item 26, wherein the disabled one or more antenna panels are deactivated or discontinuously activated.

An example of a further embodiment, which can be referred to as item 28, is the apparatus of any item 27, wherein discontinuously activated comprises monitoring with a predetermined periodicity.

An example of a further embodiment, which can be referred to as item 29, is the apparatus of item 27, wherein activating of the panel corresponds to monitoring of the transmission configuration indication state.

An example of a further embodiment, which can be referred to as item 30, is the apparatus of any of items 21 through 29, wherein the at least one memory and the computer code are further configured, with the at least one processor, to cause the apparatus to at least further perform the following: in response to the enabling of the ceasing monitoring or the discontinuously monitoring of the one or more transmission configuration indication states, decoding cell radio network temporary identifier on at least one other of the one or more transmission configuration indication states, wherein the one other was not subject to the enabling.

An example of a further embodiment, which can be referred to as item 31, is the apparatus of item 30, wherein the at least one memory and the computer code are further configured, with the at least one processor, to cause the apparatus to at least further perform the following: monitoring the at least one other of the one or more transmission configuration indication states either continuously or with a periodicity greater than the discontinuous.

An example of a further embodiment, which can be referred to as item 32, is the apparatus of item 30, wherein the at least one other of the one or more transmission configuration indication states is a lone transmission configuration indication state used to schedule the apparatus.

An example of a further embodiment, which can be referred to as item 33, is the apparatus of any of items 30 through 32, wherein the at least one memory and the computer code are further configured, with the at least one processor, to cause the apparatus to at least further perform the following: reactivating one or more additional antenna panels of the one or more antenna panels for the monitoring of the at least one other of the one or more transmission configuration indication states.

An example of a further embodiment, which can be referred to as item 34, is the apparatus of any of items 30 through 33, wherein the at least one memory and the computer code are further configured, with the at least one processor, to cause the apparatus to at least further perform the following: reactivating one or more additional antenna panels of the one or more antenna panels for a predetermined minimum time period, where the predetermined time period is configurable.

An example of a further embodiment, which can be referred to as item 35, is the apparatus of any of items 21 through 34, wherein the apparatus has a plurality of antenna panels supporting beamforming and/or permitting the apparatus to have omnidirectional reception.

An example of a further embodiment, which can be referred to as item 36, is the apparatus of any of items 21 through 35, wherein inactivity comprises no scheduling.

An example of a further embodiment, which can be referred to as item 37, is the apparatus of item 36, wherein the apparatus may be scheduled using different and/or multiple transmission configuration indication states.

An example of a further embodiment, which can be referred to as item 38, is the apparatus of any of items 21 through 37, wherein the apparatus is configured with a transmission configuration indication state that is active for a control resource set.

An example of a further embodiment, which can be referred to as item 39, is the apparatus of any of items 21 through 38, wherein the one or more transmission configuration indication states are grouped into one or more transmission configuration indication groups.

An example of a further embodiment, which can be referred to as item 40, is the apparatus of item 39, wherein each transmission configuration indication group is assigned a group specific timer based on the monitoring of the one or more transmission configuration indication states in each group.

An example of another embodiment of the current invention, which can be referred to as item 41, is an apparatus that comprises means for receiving, in a wireless communications system, configuration information comprising one or more transmission configuration indication states; means for determining, based on said configuration information, inactivity on the one or more transmission configuration indication states; and means for enabling, based on the determining, discontinuously monitoring or ceasing monitoring of the one or more transmission configuration indication states.

An example of a further embodiment, which can be referred to as item 42, is the apparatus of item 41, wherein each transmission configuration indication state of the one or more transmission configuration indication states corresponds to a beam.

An example of a further embodiment, which can be referred to as item 43, is the apparatus of any of items 41 through 42, wherein the determining is based on one or more timers with one or more time thresholds for each transmission configuration indication state of the one or more transmission configuration indication states.

An example of a further embodiment, which can be referred to as item 44, is the apparatus of item 43, wherein each time threshold of the one or more time thresholds is assigned based on ascertaining the ability of the beam to be monitored at a limen, wherein the limen is based on a periodicity reduced from continuous or from a pre-established norm, and wherein the limen is calculated or predetermined.

An example of a further embodiment, which can be referred to as item 45, is the apparatus of any of items 41 through 44, wherein a transmission configuration indication state of the one or more transmission configuration indication states corresponds to an antenna panel of one or more antenna panels of the apparatus.

An example of a further embodiment, which can be referred to as item 46, is the apparatus of item 45, further comprising: upon expiry of a timer of the one or more timers associated with the transmission configuration indication state of the one or more transmission configuration indication states, disabling the antenna panel of one or more antenna panels corresponding to the transmission configuration indication state of the one or more transmission configuration indication states.

An example of a further embodiment, which can be referred to as item 47, is the apparatus of item 46, wherein the disabled one or more antenna panels are deactivated or discontinuously activated.

An example of a further embodiment, which can be referred to as item 48, is the apparatus of any item 47, wherein discontinuously activated comprises monitoring with a predetermined periodicity.

An example of a further embodiment, which can be referred to as item 49, is the apparatus of item 47, wherein activating of the panel corresponds to monitoring of the transmission configuration indication state.

An example of a further embodiment, which can be referred to as item 50, is the apparatus of any of items 41 through 49, further comprising: in response to the enabling of the ceasing monitoring or the discontinuously monitoring of the one or more transmission configuration indication states, decoding cell radio network temporary identifier on at least one other of the one or more transmission configuration indication states, wherein the one other was not subject to the enabling.

An example of a further embodiment, which can be referred to as item 51, is the apparatus of item 50, further comprising: monitoring the at least one other of the one or more transmission configuration indication states either continuously or with a periodicity greater than the discontinuous.

An example of a further embodiment, which can be referred to as item 52, is the apparatus of item 50, wherein the at least one other of the one or more transmission configuration indication states is a lone transmission configuration indication state used to schedule the apparatus.

An example of a further embodiment, which can be referred to as item 53, is the apparatus of items 50 through 52, further comprising: reactivating one or more additional antenna panels of the one or more antenna panels for the monitoring of the at least one other of the one or more transmission configuration indication states.

An example of a further embodiment, which can be referred to as item 54, is the apparatus of item 50 through 53, further comprising: reactivating one or more additional antenna panels of the one or more antenna panels for a predetermined minimum time period, where the predetermined time period is configurable.

An example of a further embodiment, which can be referred to as item 55, is the apparatus of any of items 41 through 54, wherein the apparatus has a plurality of antenna panels supporting beamforming and/or permitting the apparatus to have omnidirectional reception.

An example of a further embodiment, which can be referred to as item 56, is the apparatus of any of items 41 through 55, wherein inactivity comprises no scheduling.

An example of a further embodiment, which can be referred to as item 57, is the apparatus of item 56, wherein the apparatus may be scheduled using different and/or multiple transmission configuration indication states.

An example of a further embodiment, which can be referred to as item 58, is the apparatus of any of items 41 through 57, wherein the apparatus is configured with a transmission configuration indication state that is active for a control resource set.

An example of a further embodiment, which can be referred to as item 59, is the apparatus of any of items 41 through 58, wherein the one or more transmission configuration indication states are grouped into one or more transmission configuration indication groups.

An example of a further embodiment, which can be referred to as item 60, is the apparatus of item 59, wherein each transmission configuration indication group is assigned a group specific timer based on the monitoring of the one or more transmission configuration indication states in each group.

An example of another embodiment of the current invention, which can be referred to as item 61, is a computer program that comprises code for receiving, by a user equipment in a wireless communications system, configuration information comprising one or more transmission configuration indication states; code for determining, by the user equipment, based on said configuration information, inactivity on the one or more transmission configuration indication states; and code for enabling, by the user equipment, based on the determining, discontinuously monitoring or ceasing monitoring of the one or more transmission configuration indication states.

An example of a further embodiment of the current invention, which can be referred to as item 62, is a computer program product comprising a computer-readable medium bearing the computer program code of item 62 embodied therein for use with a computer.

An example of another embodiment of the current invention, which can be referred to as item 63, is a computer program product embodied on a non-transitory computer-readable medium in which a computer program is stored that, when being executed by a computer, is configured to provide instructions to control or carry out: receiving, by a user equipment in a wireless communications system, configuration information comprising one or more transmission configuration indication states; determining, by the user equipment, based on said configuration information, inactivity on the one or more transmission configuration indication states; and enabling, by the user equipment, based on the determining, discontinuously monitoring or ceasing monitoring of the one or more transmission configuration indication states.

Although various aspects of the invention are set out above and/or in the independent claims, other aspects of the invention comprise other combinations of features from the described embodiments and/or the dependent claims with the features of the independent claims, and not solely the combinations explicitly set out in the claims. If desired, the different functions discussed herein may be performed in a different order and/or concurrently with each other. Furthermore, if desired, one or more of the above-described functions may be optional or may be combined.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including computer program code, wherein the at least one memory and the computer program code are configured, with the at least one processor, to cause the apparatus to at least perform:
   receiving, in a wireless communications system, configuration information comprising one or more transmission configuration indication states;
   determining inactivity on the one or more transmission configuration indication states, based on one or more timers with one or more time thresholds for each transmission configuration indication state of the one or more transmission configuration indication states of the configuration information, wherein each time threshold of the one or more time thresholds is assigned based on ascertaining the ability of the beam to be monitored at a limen, and wherein the limen is based on a periodicity reduced from continuous or from a pre-established norm, and wherein the limen is calculated or pre-determined; and
   enabling, based on the determining, discontinuously monitoring or ceasing monitoring of the one or more transmission configuration indication states.

2. The apparatus of claim 1, wherein each transmission configuration indication state of the one or more transmission configuration indication states corresponds to a beam.

3. The apparatus of claim 1, wherein the at least one memory and the computer program code are further configured, with the at least one processor, to cause the apparatus to at least further perform:
   in response to the enabling of the ceasing monitoring or the discontinuously monitoring of the one or more transmission configuration indication states, decoding cell radio network temporary identifier on at least one other of the one or more transmission configuration indication states, wherein the one other was not subject to the enabling.

4. The apparatus of claim 3, wherein the at least one other of the one or more transmission configuration indication states is a lone transmission configuration indication state used to schedule the apparatus.

5. The apparatus of claim 1, wherein inactivity comprises no scheduling.

6. The apparatus of claim 1, wherein the apparatus is configured with a transmission configuration indication state that is active for a control resource set.

7. A method, comprising:
   receiving, by a user equipment in a wireless communications system, configuration information comprising one or more transmission configuration indication states;
   determining inactivity on the one or more transmission configuration indication states, based on one or more timers with one or more time thresholds for each transmission configuration indication state of the one or more transmission configuration indication states of the configuration information, wherein each time threshold of the one or more time thresholds is assigned based on ascertaining the ability of the beam to be monitored at a limen, and wherein the limen is based on a periodicity reduced from continuous or from a pre-established norm, and wherein the limen is calculated or pre-determined; and
   enabling, based on the determining, discontinuously monitoring or ceasing monitoring of the one or more transmission configuration indication states.

8. A computer program product embodied on a non-transitory computer-readable medium in which a computer program is stored that, when being executed in hardware, is configured to provide instructions to cause the hardware to perform:
   receiving, by a user equipment in a wireless communications system, configuration information comprising one or more transmission configuration indication states;
   determining, by the user equipment, inactivity on the one or more transmission configuration indication states, based on one or more timers with one or more time thresholds for each transmission configuration indication state of the one or more transmission configuration indication states of the configuration information, wherein each time threshold of the one or more time thresholds is assigned based on ascertaining the ability of the beam to be monitored at a limen, and wherein the limen is based on a periodicity reduced from continuous or from a pre-established norm, and wherein the limen is calculated or pre-determined; and
   enabling, by the user equipment, based on the determining, discontinuously monitoring or ceasing monitoring of the one or more transmission configuration indication states.

* * * * *